United States Patent [19]

Cotter

[11] 3,873,769

[45] Mar. 25, 1975

[54] AUTOMATIC DRAWING SYSTEM

[76] Inventor: William L. Cotter, 70 Neptune St., Beverly, Mass. 02169

[22] Filed: Sept. 10, 1973

[21] Appl. No.: 395,822

[52] U.S. Cl. .................................. 178/18, 33/1 M

[51] Int. Cl. ......................... G06f 3/08, G06k 15/20

[58] Field of Search..... 235/151.11, 61.6 A, 61.6 B; 178/18, 19, 20; 33/1 M; 340/172.5; 346/33 R, 34

[56] References Cited

UNITED STATES PATENTS

| | | | |
|---|---|---|---|
| 3,366,934 | 1/1968 | Kelsey | 340/172.5 |
| 3,473,157 | 10/1969 | Little et al. | 33/1 M |
| 3,534,396 | 10/1970 | Hart et al. | 235/151.11 |
| 3,614,410 | 10/1971 | Bailey et al. | 235/151.11 |

*Primary Examiner*—Thomas A. Robinson

[57] ABSTRACT

The system is referred to in the art as an "interactive drawing system" wherein an operator may construct or reconstruct a drawing, such as an electronic circuit schematic, on a recording medium using a computer for storing position and symbol identification data and formulating and transmitting information for controlling the writing operation on the recording medium. The system includes in one embodiment a transparent coordinate digitizer element, the front surface of which is used by the operator for inputting position identification data to the computer by means of a stylus or cursor, and on the rear surface of which is mounted the recording medium. A plotting mechanism, preferably a servo-controlled X-Y plotter, is employed to record or remove information (symbols, alpha-numerics, etc.) from the recording medium, and is disposed adjacent the rear surface of the coordinate digitizer element. The symbol identification data is interfaced to the computer from a smaller digitizing symbol tablet by means of the stylus or cursor used also with the larger digitizer element, or by way of a keyboard entry.

In another embodiment the digitizer element is essentially replaced by a joystick controller and a cross-hair projector is mounted on the plotting mechanism and visible to the operator who uses the joystick to move the plotting mechanism to the desired point, at which time the position data, from the X-Y position encoders associated with the plotting mechanism, is transferred to the computer.

16 Claims, 7 Drawing Figures

AUTOMATIC DRAWING SYSTEM

BACKGROUND OF THE INVENTION

The present invention relates to an automatic drawing system typically referred to as an inter-active drawing system, of the type employing a coordinate digitizer, data processing apparatus such as a general purpose computer, and a recording medium including means for plotting or writing on the medium under computer control.

There are a number of devices and systems for providing graphic interaction between an operator and a computer system. One of the most common systems employs a cathode ray tube (CRT) display. The display may include either a standard dynamic CRT with a refresh memory or a direct view storage tube. With the dynamic CRT display a refresh memory must be used or the displayed data must be regenerated frequently enough to present a static picture to the operator. In these systems the operator normally uses a light pen or similar device to interact with the display to provide data to the computer on points of interest in the display. There are a number of disadvantages associated with this CRT type of system. One critical disadvantage is the size limitation, the largest display being approximately 24 inches in diameter. Also, the use of a refresh memory represents a significant additional cost. On the other hand, if dynamic regeneration is used, a significant portion of the available computer time is used for this purpose. The "flicker" characteristic of these displays is also objectionable. The method of inputting data is limited. Moreover, although the light pen is a direct-use device, it is relatively slow and uses additional computer time.

The other type of display, namely the direct-view storage tube, eliminates the necessity of refreshing or repeated regeneration of the display, but does have certain disadvantages. The size of the screen is more severely limited than in the case of the dynamic CRT. Selective erasing of the screen is not possible, without erasing the whole picture and rewriting all but the erased portion. The tube has a limited life. As the tube is not dynamic a light pen cannot be used thus an indirect interaction method has to be employed.

Other systems which attempt to overcome the size limitations of the CRT add electro-mechanical drawing and digitizing tables. These systems basically include a CRT display and a separately disposed drawing surface having a recording medium mounted thereon and a plotter associated therewith. The system includes mechanical arms mounted on the top surface of the drafting table. A computer is used to control the motion of the arms to make drawings or portions of drawings automatically, or the operator may move the arms manually or by means of a joystick to construct portions of the drawing or to generate input information to the computer. These devices are used in conjunction with a CRT display to form a complete graphic system. One of the disadvantages of this type of a system is that the plotter arms obscure the drawing medium. The arms are required to move over the front of the drafting surface, and thus are continuously impeding the working surface. Another important disadvantage associated with these types of systems is that the operator must generally work between several devices to accomplish the desired task.

Accordingly, it is an object of the present invention to provide an improved automatic drawing system of the type employing a coordinate digitizing element, and not requiring a CRT display.

Another object of the present invention is to provide an automatic drawing system including a coordinate digitizing element that is transparent, the front surface of which is used for inputting position identification data to the computer, and the rear surface of which is used to mount a recording medium having a plotting mechanism associated therewith. With this system, as soon as the symbol and position identification data has been received and operated on by the computer, the operator virtually immediately observes through the digitizing element the drawing of the preselected symbol at the preselected position on the recording medium.

A further object of the present invention is to provide an improved writing and erasing apparatus for the system of this invention.

Still another object of the present invention is to provide an automatic drafting system that may employ a first coordinate digitizing element for selecting position identification data and a second coordinate digitizing element for selecting symbol identification data.

SUMMARY OF THE INVENTION

To accomplish the foregoing and other objects of the present invention the automatic drafting system generally comprises means for digitizing the position of a stylus on a coordinate axis including a transparent platen having a coordinate digitizing surface on one side and electronic means for registering position identification data. In the disclosed embodiment this means for digitizing is preferably of the type disclosed in my issued U.S. Pat. No. 3,732,369. The system also includes means defining a plurality of different indicia each capable of being selectively associated with positions on the platen and including means for registering indicia identification data. In the disclosed embodiment the indicia are referred to as symbols and the means defining the symbols is a second coordinate digitizer element that may also be of the type disclosed in my U.S. Pat. No. 3,732,369. In the disclosed embodiment using two coordinate digitizer elements a common stylus or cursor is used. A recording medium is positioned on the opposite side of the platen and writing means are provided in association with this recording medium. This writing means may be an X-Y plotter mechanism. Processing means are provided generally in the form of a general purpose computer which receives the position and symbol identification data and controls the plotting mechanism. A keyboard may be used in place of the second coordinate digitizer element to enter symbol and alpha numeric data to the computer. In accordance with the present invention, the means for digitizing the position of a stylus having the coordinate digitizing surface serves a dual purpose. The front surface or coordinate digitizing surface which faces the operator, allows the operator by means of the stylus or cursor to provide position identification data for any point on this working surface. The digitizing means or platen is transparent or translucent and has a recording medium mounted on or adjacent the back surface thereof. A plotter mechanism is disposed in back of the recording medium and its associated writing and erasing mechanism may record or remove data from the recording medium. This recorded data is directly visible to the operator through the transparent platen. This data is in registry with the corresponding locations chosen on the front digitizing surface.

The other digitizing platen or tablet also has a digitizing or working surface and the same stylus can be used to select symbols. The procedure is to first select a symbol which is transferred to the computer. The same stylus is then used to select a predetermined point on the main platen which is also transferred to the computer. The computer then instructs the plotting mechanism to draw the symbol directly in back of the main digitizing surface and at the preselected position.

In accordance with another, less expensive embodiment, position data is obtained without using a digitizer element. A cross-hair projector is mounted on the plotting mechanism and the cross-hair is visible to the operator through the recording medium. The plotting mechanism is slewed by means of a control joystick to the point of interest on the drawing surface. As the cross-hair is mounted on the plotter, positional data is provided by means of the encoders of the plotting mechanism. When the point of interest is reached, the operator preferably hits an entry key and the plotter encoder data is transferred to the computer.

BRIEF DESCRIPTION OF THE DRAWINGS

Numerous other objects, features and advantages of the invention will become apparent upon a reading of the following detailed description taken in conjunction with the accompanying drawings, in which.

DETAILED DESCRIPTION

Figure 1:
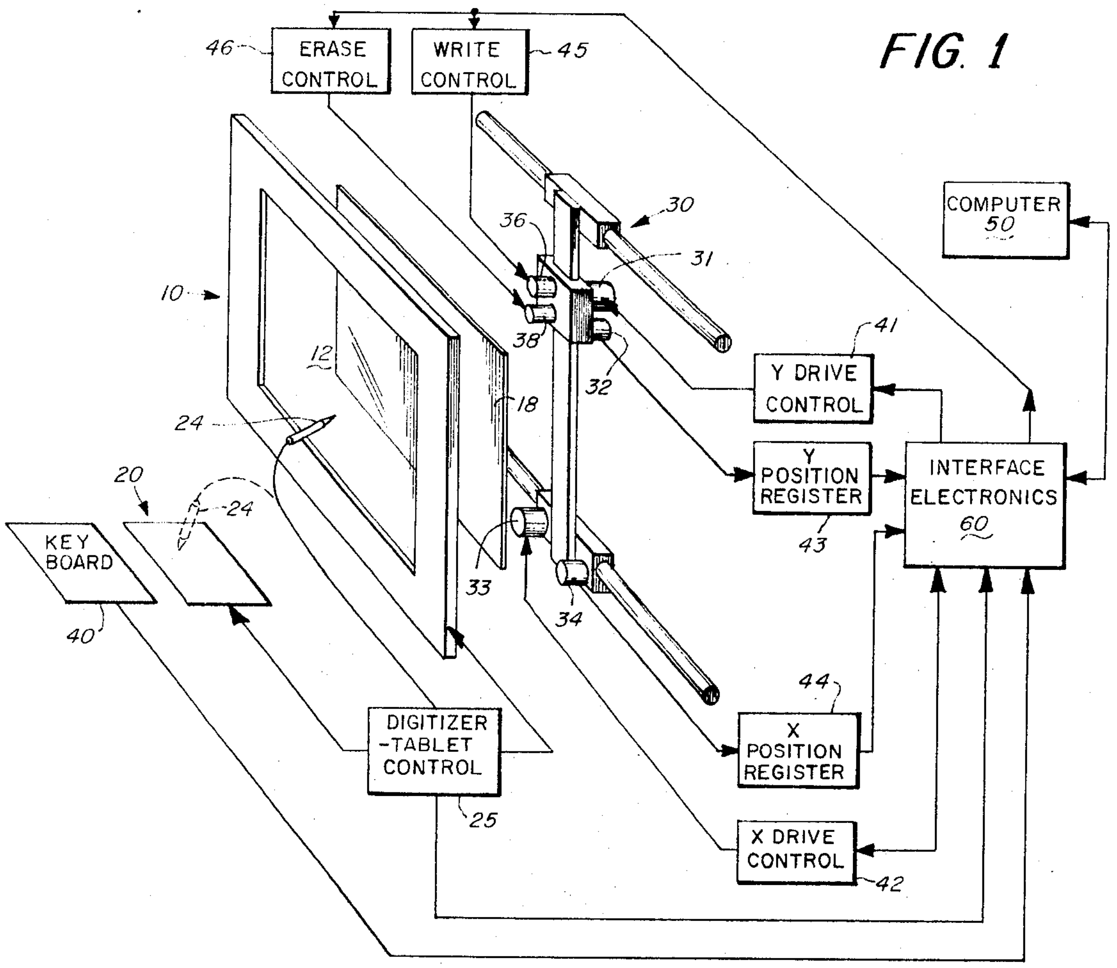
FIG. 1 is a functional block diagram of the system of the present invention using a coordinate digitizer and showing some of the mechanical structures in an exploded view.

FIG. 1 shows a functional block diagram of the system of the present invention. This system generally comprises a large transparent digitizer platen 10 having a front digitizer or working surface 12, a symbol tablet 20, a stylus 24, a plotting mechanism 30 including associated recording and erasing mechanisms, a keyboard 40, a computer 50, and interface and control electronics.

Figure 2:
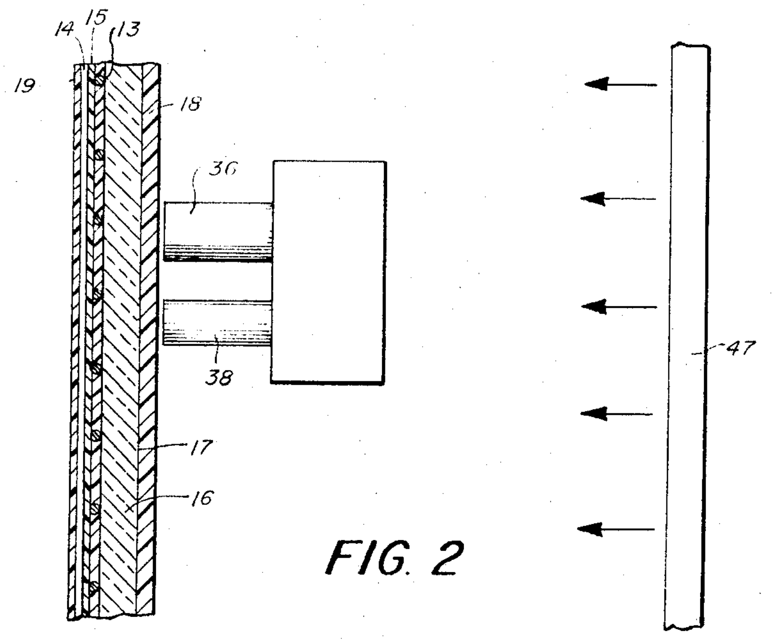
FIG. 2 is a cross-sectional enlarged view through the position digitizer platen and also showing the write/erase head and light array.

The digitizer platen 10 is preferably of the type disclosed in my U.S. Pat. No. 3,732,369. The digitizer platen as shown in that patent and as disclosed in FIG. 2 herein comprises a conducting orthorgonal grid structure. As depicted in FIG. 2, the grid structure includes a set of X conductors 13, and an orthorgonally disposed set of Y conductors 14, having a spaced insulating layer 15 disposed therebetween. The X and Y conductors are affixed to or embedded in a glass substrate 16, which is preferably transparent. A recording medium 18 is mounted to the back surface 17 of the substrate 16. The grid structure shown in FIG. 2 may be formed by a deposition technique as used in the microelectronics industry or alternatively, relatively small physical wires may be embedded in a transparent plastic medium. The wires should be sufficiently thin to provide minimum occlusion of the working surface 19.

The symbol tablet 20 may be identical in construction to the digitizer platen 10 and is thus shown only in block form in FIG. 1. The tablet 20 would include a conducting orthorgonal grid of the type disclosed in my U.S. patent referred to herein.

The stylus 24 is shown in dotted lines in FIG. 1 in a position to detect and convey symbol identification data to the digitizer-tablet control 25 shown in block form in FIG. 1. The control 25 is shown in more detail hereinafter in the block diagram of FIG. 4.

The symbol tablet 20 is used much as a template is used by a draftsman. A symbol overlay is placed on the tablet and any symbol may be selected by the stylus 24 which is also used commonly with the digitizer platen 10. The positional data detected from tablet 20, which is represented by a symbol identification code recognizable by the computer, is conveyed by way of control 25 to interface electronics 60. At the proper time this symbol identification data, along with the position identification data from platen 10 is transmitted from electronics 60 to computer 50. The computer is programmed in a manner to instruct the plotter mechanism 30 to generate the selected symbol. The operator selects the appropriate symbol by pointing with the stylus to the symbol on the tablet 20. This action instructs the computer as to which symbol is to be drawn. In the sequence of use the operator then points to the location on digitizer surface 12 where the symbol is to be disposed. When the computer receives both the symbol and position identification data, the computer instructs the plotting mechanism to draw the symbol at the desired location on the recording medium 18. The symbol appears at the digitizer coordinate location specified directly behind the platen 10. The symbol and identification data is also stored in the computer 50 for possible later reference.

In FIG. 1 the plotter mechanism 30 is of the X-Y plotter type and includes a Y drive motor 31 and associated Y position encoder 32; and X drive motor 33 and X position encoder 34. The drive motors are preferably servo drive motors whose operating rate can be controlled and may be of conventional design. The position encoders may also be of conventional design. The plotting mechanism also includes a write head 36 and an erase head 38 which are also depicted in FIG. 2. FIG. 1 shows the Y drive control box 41 and the X drive control box 42 which control the respective drive motors 31 and 33 from commands received from the interface electronics 60. Positional information is transferred from the position encoders by way of Y position register 43 and X position register 44 to electronics 60.

In a preferred embodiment the servo-drive motors 31 and 33 are operated in a typical rate mode with this rate being controlled by a digital word from computer 50. This computer word may vary the rate from 0 to a maximum servo-rate by the value of a word transmitted to the servo.

FIG. 1 also shows the write control box 45 and erase control box 46 which couple from interface electronics 60 and control their respective write head 36 and erase head 38.

Figure 3A:
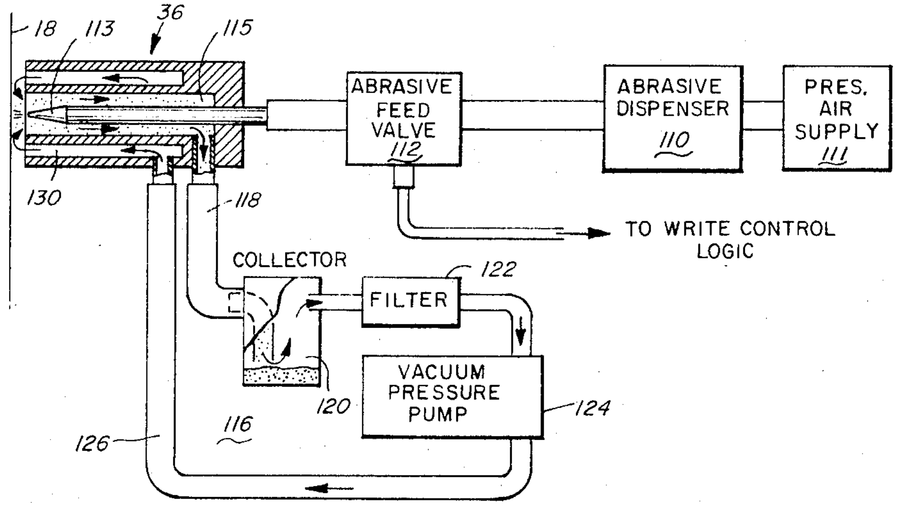
FIG. 3A shows in somewhat more detail the writing device of the present invention.
Figure 3B:
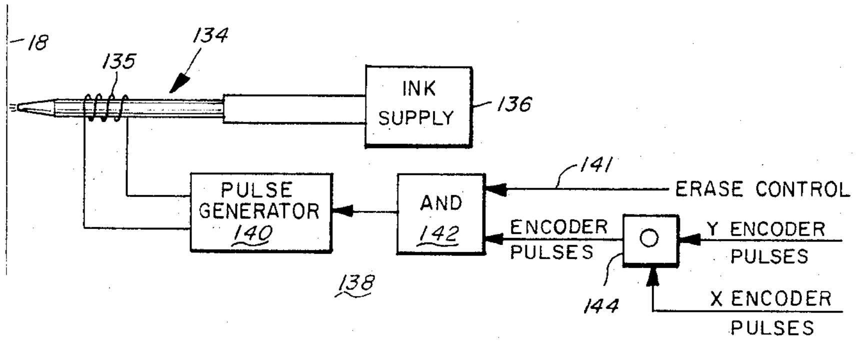
FIG. 3B illustrates the erasing device in accordance with one embodiment of the present invention.
Figure 4:
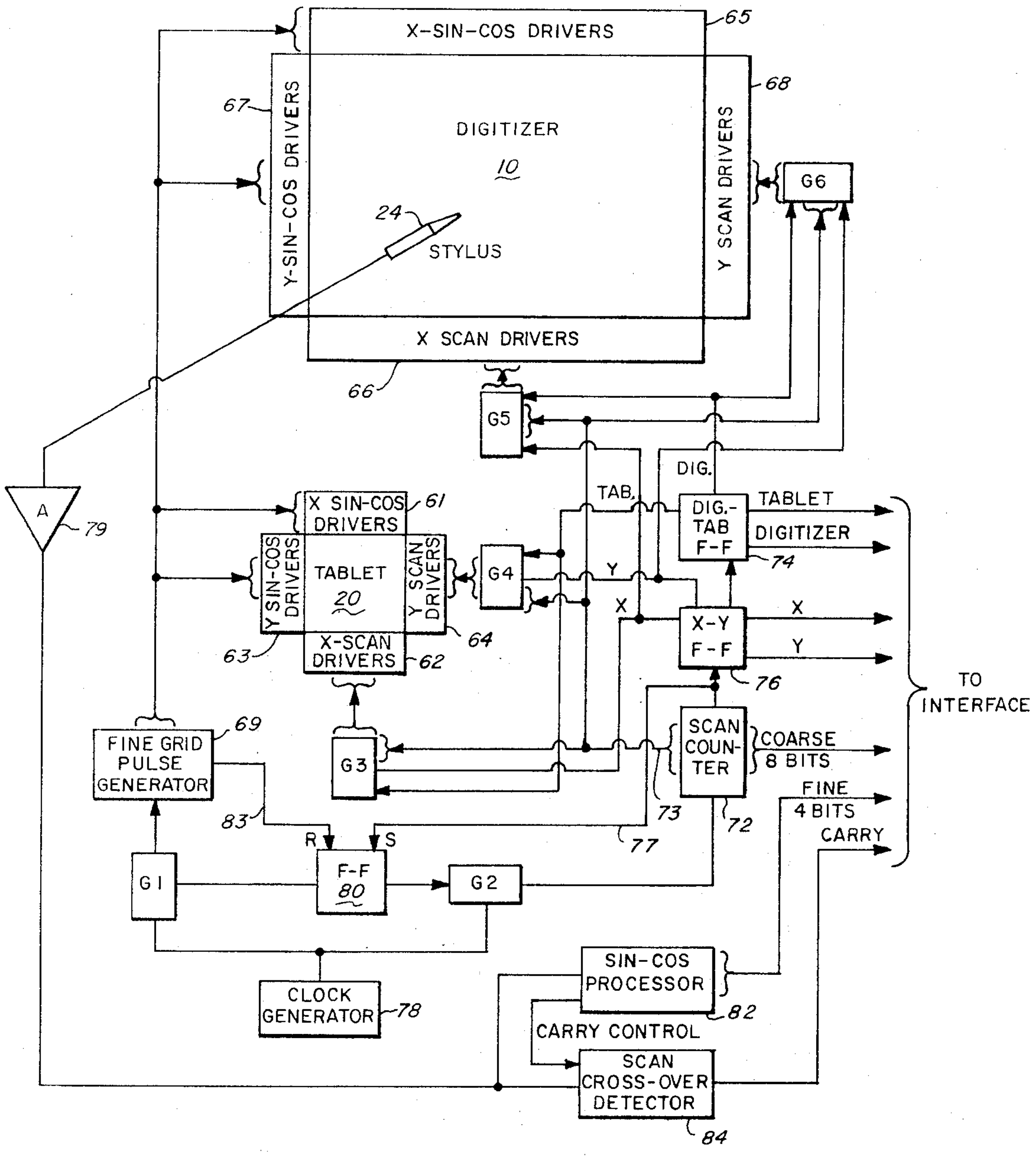
FIG. 4 is a block diagram showing parts of the system of FIG. 1 in more detail and in particular the digitizer-tablet control.
Figure 5:
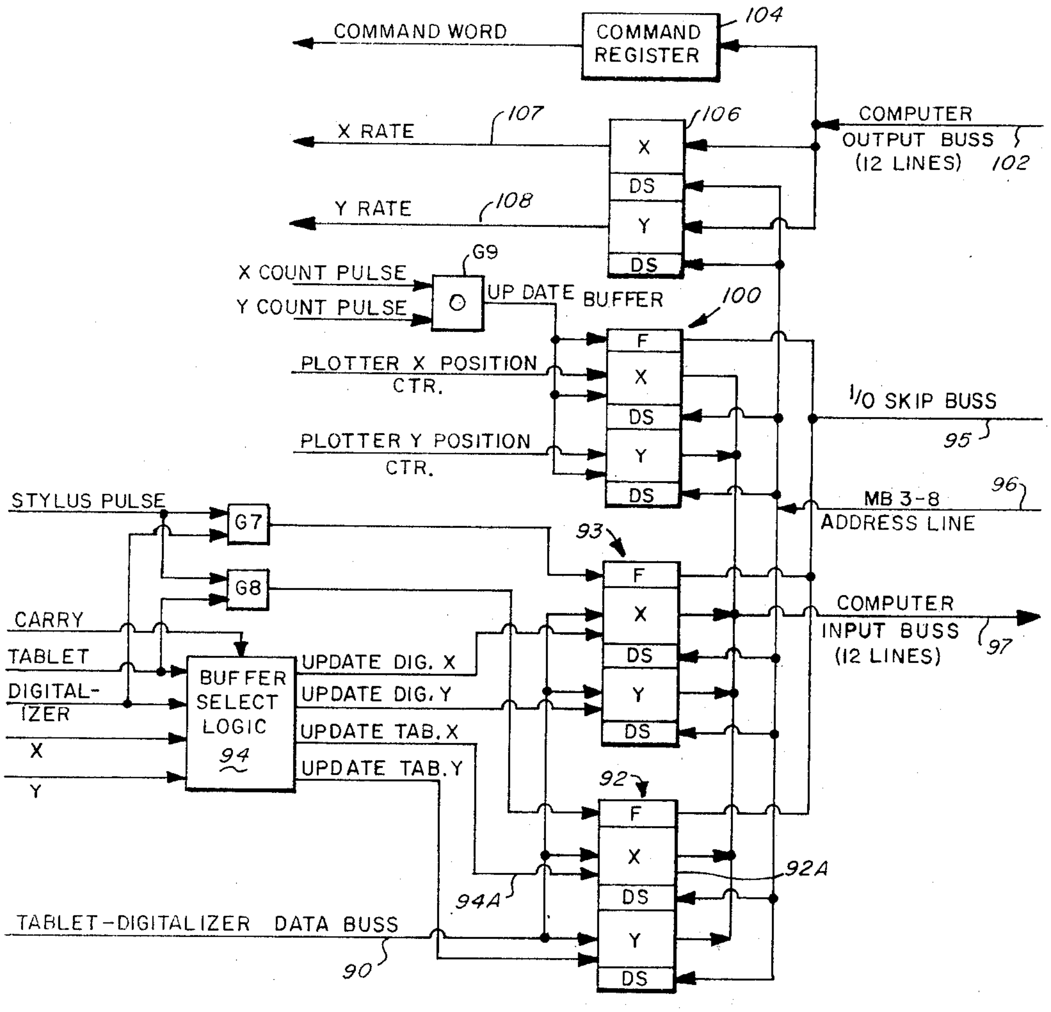
FIG. 5 is a more detailed block diagram of the interface electronics shown in FIG. 1.

FIGS. 3A and 3B shown in somewhat more detail the writing and erasing mechanisms of the present invention. FIG. 4 shows in more detail the control 25 and FIG. 5 shows in more detail the interface electronics 60. The computer 50 used in one embodiment of the present system of this invention is a PDP 81 computer manufactured by Digital Equipment Corporation. The interface electronics 60 is conventional in structure and is of the type used with that computer.

FIG. 2 shows a portion of the digitizer platen 10 discussed hereinbefore and also shows, in addition to the write and erase heads, a back light panel 47 which is for directing light toward the platen and associated recording medium. In the preferred embodiment discussed in more detail hereinafter the recording medium is a drafting film printed with ink to be opaque. Writing is accomplished by selectively removing ink from the desired areas. The back light panel 47 provides sufficient light so that an observer at the front of the machine can readily observe the removal of the ink.

U.S. Pat. No. 3,732,369 completely describes the apparatus and technique for digitizing the position selected by the stylus into X-Y coordinates which are in turn represented by separate digital words. To accomplish this, and as taught in that patent, the platen has a coarse grid formed by two crossed sets of parallel wires regularly spaced along the coordinate axis. The platen also has a fine grid of crossed sets of parallel wires spaced more closely along the coordinate axis than the coarse grid wires. The wires of a fine grid set are constituted by four groups of wires. To digitize the stylus position along one coordinate axis, all the wires of a group are electrically pulsed together, each group being pulsed in turn. The wires of the coarse grid are then pulsed, one at a time, in sequence. The signals detected by the stylus from a pulsing of the fine wires are used to establish a fine digitized position that periodically reoccurs along the coordinate axis. The signals detected by the stylus from the pulsing of the coarse wires are used to establish a coarse digitized positoned that uniquely fixes the fine position on the coordinate axis. The system then scans the wires of the other coordinate axis in the same manner to digitize the position of the stylus on that axis. The system alternately scans the coordinate axis to repetitively digitize the position of the stylus with sufficient rapidity to track the movements of the stylus. However, in the present invention the control 25 is somewhat different in that the stylus 24 is useable with either tablet 20 or platen 10. Accordingly, one arrangement for the control 25 is shown in the block diagram of FIG. 4 which also depicts in block form the digitizer platen 10, symbol tablet 20, and stylus 24, shown positioned relative to the platen 10.

In FIG. 4 the digitizer platen 10 is, at one time, driven along one axis to detect a fine position and is then driven to detect a coarse position. The drivers associated with the other coordinate are also activated and the tablet 20 is activated in a similar manner. In the embodiment shown in FIG. 4 the following sequence is followed;

X sin-cos drivers 61, X scan drivers 62, Y sin-cos drivers 63,

Y scan drivers 64, X sin-cos drivers 65, X scan drivers 66,

Y sin-cos drivers 67, and Y scan drivers 68. This driving sequence is continuously repeated.

The fine grid pulse generator 69 has a multi-conductor output which is shown as a single line in FIG. 4, and generates sequential pulses for the drivers 61, 63, 65, and 67. The X and Y scan drivers are controlled from the scan counter 72 and flip-flops 74 and 76. The scanning rate is determined primarily by the basic clock generator 78.

It can be assumed that the repetitive operation is in a condition wherein the coarse bits have been detected and the output on line 77 from counter 72 sets flip-flop 80. With flip-flop 80 set gate G1 is enabled and gate G2 is inhibited. The pulses from clock generator 78 are thus directed by way of gate G1 to pulse generator 69 sequentially driving one of the sin-cos drivers 61. The signals capacitively picked up by stylus 24 are coupled via amplifier 79 to sin-cos processor 82 which, as disclosed in U.S. Pat. No. 3,732,369 may comprise comparators and binary logic. The output of processor 82 is a 4 bit absolute word defining the fine position associated with one of the axis of one of the digitizers. In the example referred to, the 4 bits represent the X coordinate of tablet 20. Assuming these to be the conditions, the flip-flop 74 is in a condition wherein its tablet output is high and flip-flop 76 is in a condition wherein its X output is high.

After the fine sensing has been accomplished an output is generated on line 83 from generator 69 to reset flip-flop 80 thereby enabling gate G2 which directs the pulses from generator 78 to counter 72 thereby commencing operation of counter 72 and the scanning operation. The flip-flop 76 is still indicating an X coordinate and the flip-flop 74 is still indicating a TABLET output. The multi-line output from counter 72 shown as line 73 in FIG. 4 is coupled to gates G3, G4, G5, and G6. With the flip-flops 74 and 76 in the position indicated hereinbefore only the gate G3 is enabled and the pulses from scan counter 72 are coupled to drivers 62. The stylus 24 which is still contacting tablet 20 in this example, couples signals by way of amplifier 79 to the scan cross-over detector 84 which also receives an input referred to as the carry control from processor 82. The output of the scan detector 84 is a pulse which occurs when the scan counter is at a count defining the coarse position of the stylus. At the occurrence of this pulse both the counter reading from counter 72 which is of eight bits and the four bit word from processor 82 are transferred to the interface electronics discussed hereinafter with reference to FIG. 5. This combined word defines the absolute position of the stylus in one coordinate. When the scan counter 72 completes its count the flip-flop 76 changes state and its Y output is activated. The flip-flop 80 is also set and the fine sensing occurs by enabling drivers 63. Thereafter, gate G4 is enabled, the scan counter 72 is permitted to count and the Y scan drivers 64 are operated. The scan counter 72 continuously counts and eventually changes the state of flip-flop 76. This action in turn changes the state of flip-flop 74 and its DIGITIZER output is enabled thereby activating in sequence the X and Y scan drivers associated with digitizer platen 10. A contact closure in the stylus 24 sets a control flag in the computer interface as discussed in more detail hereinafter to alert the computer that a new coordinate is available for transfer thereto.

Figure 6:
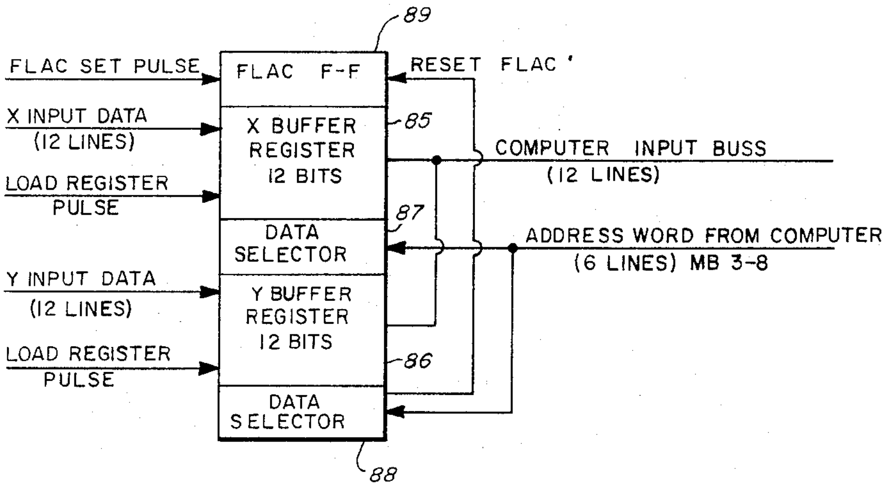
FIG. 6 shows in somewhat more detail one of the registers depicted in FIG. 5.

FIG. 5 shows a block diagram of the logic that may be included in the interface electronics 60 shown in FIG. 1. This logic generally comprises a series of buffer registers. FIG. 6 shows one of these buffer registers which includes an X buffer register section 85 and a Y buffer register 86. Data selectors 87 and 88 are associated with X buffer register 85 and Y buffer register 86, respectively. A flag flip-flop 89 is also included in FIG. 6 and is in its set condition to indicate to the computer that data is available for transfer to the computer. When the flag flip-flop is set an address word may be transmitted to the data selectors. When a data selector receives its corresponding address word the contents of the buffer register such as register 85 are transferred by way of the input buss to computer 50. In FIG. 6 the buss and address word are shown as a single line however, these comprise a plurality of lines as indicated in FIG. 6. The loading of the register shown in FIG. 6 is by means of selective load pulses which can transfer data on the X input lines to register 85 and on the Y input lines to register 86. Usually, the Y load pulse sets the flag flip-flop.

Referring again to FIG. 5, there are shown a plurality of registers and other associated logic circuitry. In addition, there are connections from control 25, to and from computer 50, and to and from the plotting mechanism 30. In FIG. 5 the connections to the external devices and the connections between blocks are shown by a single line. However, especially where indicated some of the tie lines may correspond to multi-wire lines.

In FIG. 5, the tablet-digitizer data buss 90 comprises 12 lines, four of which represent the fine position and eight of which represent the coarse position. The data buss 90 couples to registers 92 and 93 and this data is loaded into these registers by means of control load pulses coupled from buffer select logic 94. The register 92 is for storing the X-Y coordinate data associated with the tablet and the register 93 is for storing the X-Y coordinate data associated with the digitizer platen.

The inputs to logic 94 include the four lines identified as the tablet, digitizer, X,Y lines. When the carry signal occurs after both the fine and coarse data have been detected, this signal is coupled to logic 94 to send an update signal in the form of a load pulse to one of the sections of either register 92 or register 93. For example, if the X signal is present and the tablet signal is present and a carry signal occurs then a load pulse is generated on line 94A to the X section 92A of register 92 thereby loading that section of the register. When the contact stylus pulse occurs one of the gates G7 or G8 is enabled and the flag flip-flop of one of the registers is set. When this occurs the computer senses the setting of the flag flip-flop by means of the I/O skip buss 95 and the computer then knows the data is available. A multi-bit signal may then be sent on address line 96 to the proper data selector, and if for example the data selector associated with section 92A is interrogated, then the data in that section is transmitted by way of the computer input buss 97 to the computer.

FIG. 5 also includes another two section register 100 which stores plotter position data for transmission to the computer. The control of data from register 100 to the computer is also by way of input signals on address line 96 and a sensing of the setting of the flag-bit by line 95. The setting of the flag-bit and the loading of the register sections is provided by a signal received from the output of OR gate G9. When either an X or Y count pulse is received the contents of the X and Y position counters are transferred to the corresponding sections of register 100. The X,Y count pulses are generated from the X and Y outputs shown in FIG. 4 from flip-flop 76. When the data has been received by the computer and the program of the computer is ready to generate a command, these command signals are coupled on the computer output buss 102 to the command register 104 and another two section register 106. When the address line 96 has the proper code thereon the data selectors associated with register 106 cause the data words stored therein to be coupled on the output lines 107 and 108 referred to herein as the X rate and Y rate signals. These are the signals, as shown in FIG. 1 that couple to the X drive control 42 and the Y drive control 41 for controlling the rate of operation of the servos associated therewith.

The command register 104 is used to control the other functions such as the turning on of the writing mechanism or the erasing mechanism and also may have an output data word for indicating when the servos should start and stop. In FIG. 1 this output is shown as coupling to the write control 45 and the erase control 46.

The recording medium for the device may actually take two forms. In one form a drafting film is printed with ink to be opaque. Writing on this film is accomplished by selectively removing ink from the desired areas and erasing is accomplished by inking over the areas to be removed. In the alternate form a plain translucent drafting film is used. Writing is accomplished by depositing ink on the desired areas and erasing is accomplished by selectively removing this ink. The preferred embodiment and the one discussed in FIGS. 3A and 3B is the first form wherein writing is accomplished by selectively removing ink from the desired areas.

The writing on the recording medium is actually programmed to write in a reverse manner so that the proper symbol or indicia is formed when viewed from the operator's side of the platen.

FIG. 3A of the present application shows the writing apparatus which includes writing head 36 (see FIG. 1) abrasive dispenser 110, abrasive feed valve 112, and collection section 116. Writing is accomplished by abrading the ink off the recording medium 18 by means of a high velocity stream of abrasive powder. This powder is fed from abrasive dispenser 110 under pressure supplied by the pressurized air supply 111 by way of valve 112 to the feeding nozzle 113. The powder is typically under a pressure of 20–40 psi. The pressure controls line density while the line size or thickness is controlled by providing different nozzles 113 on the tip of the abrasive head. The abrasive nozzle is surrounded by a vacuum manifold 115 which collects the expended abrasive material after impingement on the recording surface, as well as the ink particles removed from the surface. The expended powder is returned by means of the vacuum line 118 to a collector 120. The vacuum line also continues through a filter 122 which prevents the abrasive material from entering the vacuum-pressure pump 124. Another vacuum section 126 couples to the pressure manifold 130 which surrounds the vacuum manifold 115. The nozzle 113 and manifolds 115 and 130 are preferably concentrically arranged.

The pressure manifold 130 serves at least two purposes. One purpose of the manifold is to set up a pressure barrier which aids in funneling the expended abrasive into the vacuum manifold. The other purpose is to prevent the vacuum manifold from causing the recording medium to lift off its mounting surface because of the flow of air across the recording surface.

FIG. 3B shows the erasing mechanism of the present invention in the form of a demand feed ink jet 134, ink supply 136, and control means 138. The control means includes a pulse generator 140 which provides the proper amplitude pulse and proper shaped pulse for dirving the coil 135 of the ink jet. Each time the ink jet is pulsed a spot of ink is deposited on the recording surface. The pulse generator is activated from gate 142 which is an AND gate receiving an erase control signal on line 141 and another signal from OR gate 144. As long as the erase control signal is present on line 141, and each time an X or Y encoder pulse appears then a pulse is generated from generator 140. These pulses occur for every movement of 0.0025 inches in either axis. As the deposited ink spot size is approximately 0.010 inches in diameter a line is deposited on the recording medium as the plotter moves.

With a preferred embodiment of the invention has been described, it is obvious to those skilled in the art that the invention can take other forms. For example, the servo motors may be replaced with stepping motors for controlling the plotter mechanism. Moreover, the digitizer may be of the incremental or absolute type and may use capacitive magnetic, magnostrictive, or any other reasonable means of detecting signals from the digitizer surface. Also, the ink jet system shown in the drawings may be of another type using a standard recording pen. Also, various other types of computer interfaces can be easily adapted to the teachings of this system depending upon the particular general purpose computer that is used.

Figure 7:
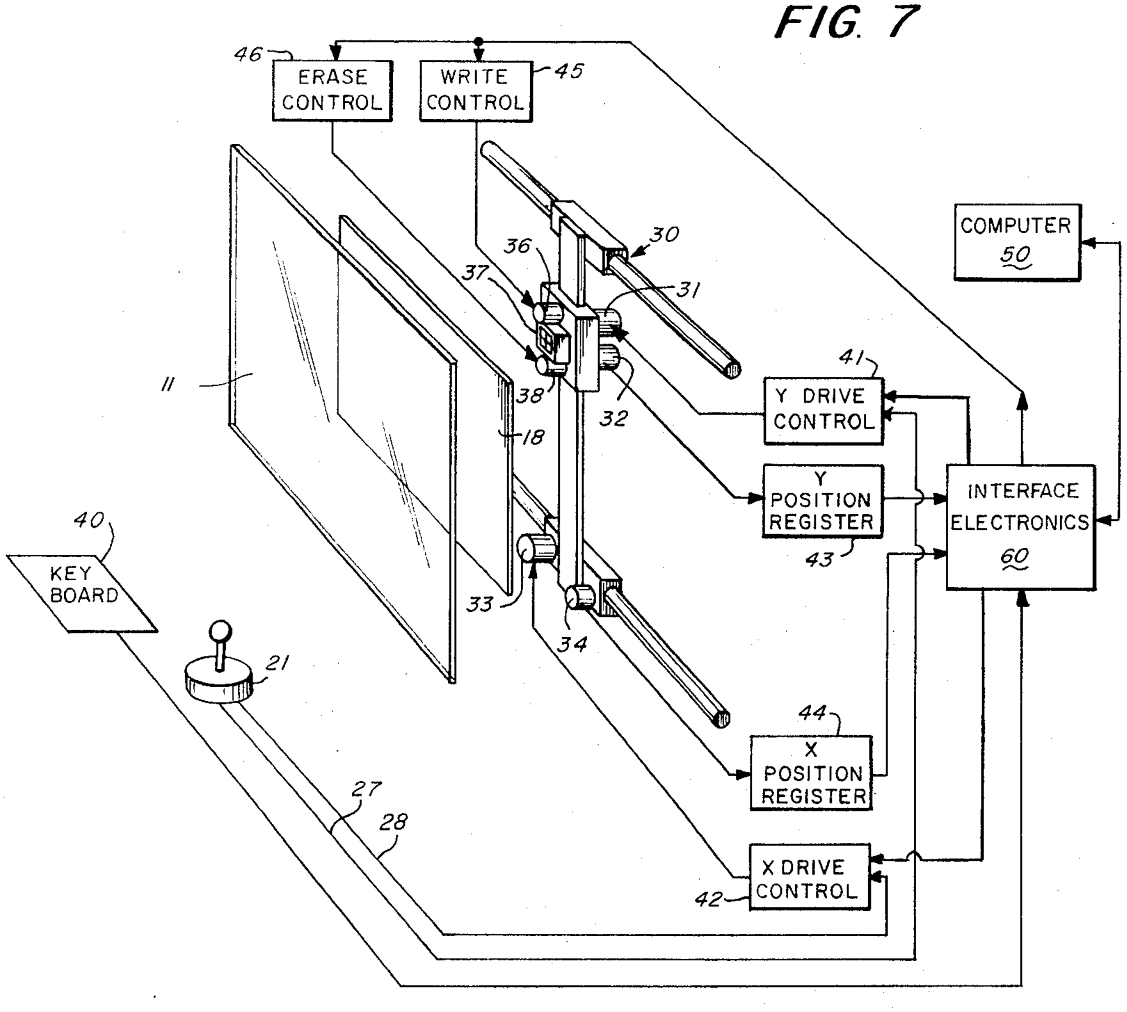
FIG. 7 is a functional block diagram similar to the one shown in FIG. 1 and using a cross-hair projector and motion control device.

Also, although the preferred embodiment employs a digitizer platen, the invention should not be limited to that specific system but is contemplated as also covering systems or apparatus as illustrated in FIG. 7 wherein like reference numbers are used for like parts that also appear in FIG. 1. In FIG. 7, the platen 10 has been replaced by a transparent plate 11 that may be of the same size as working surface 12. The tablet 20 and control 25 are not used but a cross-hair projector 37 is mounted intermediate heads 36 and 38 and a motion control device, shown as joystick control 21, is used. Both the projector 37 and control 21 may be of conventional design.

In FIG. 7, in addition to the rate signals being sent from the computer, they are also received by way of X and Y drive control lines 27 and 28 which connect respectively to controls 42 and 41. The joystick provides rate signals, the polarity and magnitude of which are dependent upon the displacement of the stick from its center position. During manual positioning the computer signals are inhibited and the signals are derived from the joystick. Alternatively, during automatic operation the joysick signals are inhibited. The plotter encoders 32 and 34 continuously provide position data on the cross-hair position. When a point of interest is reached a key of keyboard 40 is depressed thereby signaling the computer via the interface electronics to read the position data. In this embodiment symbol data is fed to the computer from the keyboard.

The computer interface electronics 60 of FIG. 7 is similar to the electronics shown in detail in FIG. 5 except that there is no need to include the section for receiving tablet and digitizer position data.

In view of the obvious modifications that can be made in the embodiments of the invention herein described and in view of the different form the invention can take, it is not intended to limit the invention to the precise arrangements illustrated herein. Rather, it is intended that the scope of the invention be delimited by the appended claims and that within the scope be included such structures as depart from the essential nature of the invention only by obvious changes or by the substitution of equivalence that do not alter the basic scheme of the invention.

What is claimed is:

1. An automatic drawing system comprising;
means for digitizing the position of a stylus on a platen having a working surface on one side and including means for registering position identification data,
means defining a plurality of different indicia each capable of being selectably associated with positions on the platen and including means for registering indicia identification data,
a recording medium positioned adjacent the other side of said platen,
means for fixedly writing on said recording medium,
and processing means responsive to said position and indicia identification data for controlling said means for writing.

2. The system of claim 1 wherein said platen is constructed so that the writing on the recording medium is visible from the working surface side of said platen.

3. The system of claim 2 wherein said platen is substantially transparent, said writing appearing at a position on said recording medium in line with the position indicated by the position identification data generated from a selected point on the working surface of the platen.

4. The system of claim 1 wherein said means defining a plurality of indicia includes a symbol tablet and means for digitizing positions on said symbol tablet which are represented by symbol identification data interpretable by said processing means.

5. The system of claim 4 wherein said stylus is used to mutually exclusively select positions on said platen and tablet.

6. The system of claim 1 wherein said writing means includes a plotting mechanism for receiving control commands from said processing means and including a writing mechanism and erasing mechanism.

7. The system of claim 6 wherein said recording medium includes a light transmitting film covered with an opaque ink, writing being accomplished by removing the ink and erasing by replacing the ink.

8. The system of claim 1 wherein said means for digitizing includes a marker means associated with and moveable with said writing means and visible from said working surface.

9. The system of claim 8 including means for manually controlling movement of said writing means.

10. The system of claim 1 wherein said processing means includes storage means for both said position data and indicia data and means responsive to said position data for positioning said writing means and responsive to said indicia data for moving said writing means to create the indicia on the recording medium.

11. In an automatic drawing system having a platen defining a digitizing surface for selecting predetermined positions, means defining a plurality of preselectable indicia or symbols, a recording medium, means for writing on the recording medium, and processing means responsive to position and indicia data for controlling said means for writing, the improvement characterized by, said recording medium being positioned on the side of said platen opposite said digitizing surface, said platen being at least translucent, whereby the writing on said recording medium appears in the form of the preselected indicia or symbol and in line with the predetermined position selected on said digitizing surface.

12. In the system of claim 11 wherein said writing means includes a plotting mechanism disposed on one side of said recording medium spaced from said platen.

13. In the system of claim 12 wherein said recording medium is mounted to the rear surface of said platen.

14. In the system of claim 11 including light means for directing light toward the platen to enhance the writing on the recording medium.

15. An automatic drawing system comprising:

a recording medium, means defining a plurality of different indicia each capable of being associated with positions on the recording medium and including means for storing indicia identification data, a plotting mechanism including means for writing on the recording medium and positioned on one side of said recording medium, position identification marker means disposed on said plotting mechanism visible from the other side of the recording medium for indicating the position of the plotting mechanism, means for manually controlling the movement of said plotting mechanism so that said marker means is moveable to a preselected position on said recording medium, and processing means responsive to at least said indicia data for controlling said plotting mechanism.

16. The system of claim 15 wherein said marker means includes means defining a cross hair and said means for manually controlling includes a joy stick arrangement.

* * * * *